(12) United States Patent
Moore et al.

(10) Patent No.: US 7,881,989 B2
(45) Date of Patent: Feb. 1, 2011

(54) INFORMATION MODEL FOR PROPERTY RECORDS MANAGEMENT

(75) Inventors: Jennings Wayne Moore, Springfield, OH (US); Larry Joseph Deniston, Portage, MI (US); Terry Lee Merkle, Kalamazoo, MI (US); Douglas Alan Bennett, Springfield, OH (US); Robert James Golisek, Paw Paw, MI (US)

(73) Assignee: Manatron, Inc., Portage, MI (US)

( * ) Notice: Subject to any disclaimer, the term of this patent is extended or adjusted under 35 U.S.C. 154(b) by 1426 days.

(21) Appl. No.: 10/923,626

(22) Filed: Aug. 20, 2004

(65) Prior Publication Data

US 2006/0041442 A1  Feb. 23, 2006

(51) Int. Cl.
*G06F 17/22* (2006.01)
(52) U.S. Cl. ............... 705/31; 705/1; 705/2; 705/3; 705/6; 705/7; 705/10; 705/11; 705/16; 705/17; 705/19; 705/26; 705/28; 705/30; 705/33; 705/34; 705/35; 705/38
(58) Field of Classification Search .............. 705/31
See application file for complete search history.

(56) References Cited

U.S. PATENT DOCUMENTS

| 5,414,621 A * | 5/1995 | Hough ............ 705/10 |
| 7,107,239 B2 * | 9/2006 | Graff ............. 705/36 R |
| 7,249,072 B1 * | 7/2007 | Nearhood et al. ...... 705/31 |
| 2004/0153382 A1 * | 8/2004 | Boccuzzi et al. ....... 705/34 |
| 2005/0261995 A1 * | 11/2005 | Phelan ............ 705/31 |

OTHER PUBLICATIONS

Property tax news, Anonymous, Assessment Journal, v8n3, p. 15-22, May/Jun. 2001.*

* cited by examiner

*Primary Examiner*—F. Zeender
*Assistant Examiner*—Fawaad Haider
(74) *Attorney, Agent, or Firm*—Warner Norcross & Judd LLP

(57) ABSTRACT

An information model for a party and property records management system includes a legal party role object for maintaining relationships between objects, such as legal party objects and revenue-object objects, within the information model. A legal party object could have several associated objects, such as an identification number object or a legal party communication object.

1 Claim, 3 Drawing Sheets

INFORMATION MODEL FOR PROPERTY RECORDS MANAGEMENT

BACKGROUND OF THE INVENTION

Taxation of property is a prime means for governmental units to collect money. For example, school districts, cities, townships, park districts and other governmental units levy a tax on real estate. The taxes collected are then used to finance governmental services. The collection of these taxes is critical to the functioning of the governmental units.

Collection of taxes on property is complex. First, there are many different types of property that may be taxed. Real estate, automobiles, business licenses, and boats are just some of the properties that can be taxed. There are a multitude of different entities that may own property. Individuals, corporations, not-for-profit corporations, and partnerships, for example, may own property. The property itself may change. A real estate parcel may be divided, improved or joined with other parcels. The parcel may even be renamed. Personal property, such as an automobile, may change physical location from one address to another.

Further, property can also change classifications. For example, a mobile home may be initially classified as personal property. When it becomes affixed to a foundation on land, it may be considered as real property.

Finally, there are a multitude of different governmental units imposing a tax on property. A single piece of property can be taxed by several governmental units. To further complicate the collection of taxes, the various units may not have identical jurisdictions. A community may be contained in more than one county. The community may have a park district which can collect taxes over a geographical area which is different from the community itself. School districts may include multiple communities. Further, special assessments for governmental improvement of real estate, such as for the installation of sidewalks and street lighting, may apply to only a select group of properties within a community.

In order to manage the collection of property taxes, governmental units usually have a tax officer devoted exclusively to collection of property taxes. The tax officer usually is not directly responsible for maintaining records associated with the property. Thus, the tax officer must rely on the various other services to maintain property records. For example, one government agency may be charged with maintaining vehicle registrations while a second government agency may be responsible for maintaining real estate records while a third agency may be responsible for assessing the value of the property.

A simplified information model for managing the disparate data sources in a single integrated data structure is highly desirable.

SUMMARY OF THE INVENTION

The aforementioned problems are overcome in the present invention. An information model provides the basis for a system and a method for property records management.

The information model has a legal party object. Information with respect to legal parties that have rights and tax responsibilities with respect to taxable property are managed by way of the legal party object. The legal party object also is capable of serving a dual purpose as the key entity in a broader constituency relationship management (CRM) system that integrates the information for all facets of the local government enterprise. An identification number object is associated with each legal party object. An identification number is an externally assigned identification number such as a driver's license number. A legal party communication object is also associated with each legal party object. The legal party communication provides the address or other means to communicate with a legal party.

The information model also may contain a revenue-object object. A revenue-object is any item which may be taxed, such as, for example, real property, business licenses and motor vehicles. The revenue-object object has a situs address object for information concerning the location of the property. A tax authority group role object relates tax authority group objects, such as government bodies capable of levying a tax, to revenue-object objects. Various other objects are types of revenue-object object, such as parcel objects, filing objects and non ad valorem objects.

The information model connects revenue-object objects and legal party objects by way of legal party role objects. Legal party roles contain the definition of the relationship between a specified legal party and a revenue-object. For example, a legal party may be the owner of a particular revenue-object, such as an apartment building, while another legal party may be a tenant of the apartment building.

By utilizing the information model as hereinafter described and through the use of the legal party object, the revenue-object object and the legal party role object, the management of the process of collection and levying taxes is greatly improved, allowing for more robust and flexible systems to assist in the tax collection process and to provide a foundation for local government enterprise information management of citizen and property data.

These and other objects, advantages and features of the invention will be more readily understood and appreciated by reference to the detailed description and the drawings.

DETAILED DESCRIPTION OF THE DRAWINGS

Figure 1:
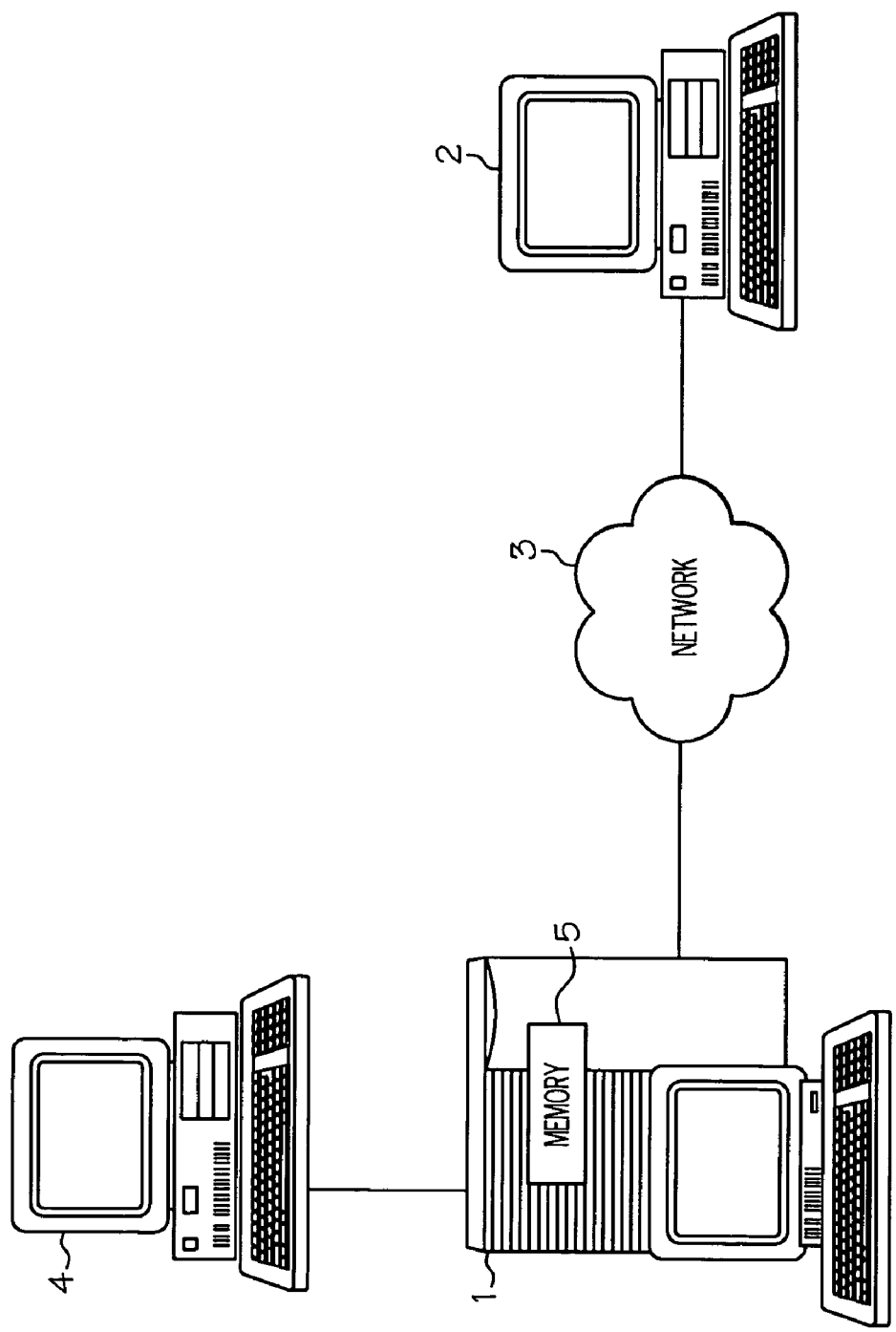
FIG. 1 is a computer network.

FIG. 1 shows a computer network. Server 1 is connected to workstation 2 by way of network 3. Workstation 4 is directly connected to server 1. Server 1 includes memory 5. An application program operating on server 1 may access memory 5. Memory 5 additionally may contain an application program which is loaded for execution on server 1. Additionally, workstations 2, 4 may access server 1 and memory 5. Signals representing the contents and structure of memory 5 are sent between server 1 and workstations 2, 4.

Server 1 is representative of a data processing system. Server 1 could be a cluster of computers or a single computer. Memory 5 could be physically located within server 1 or could be distributed across many different devices.

Figure 2A:
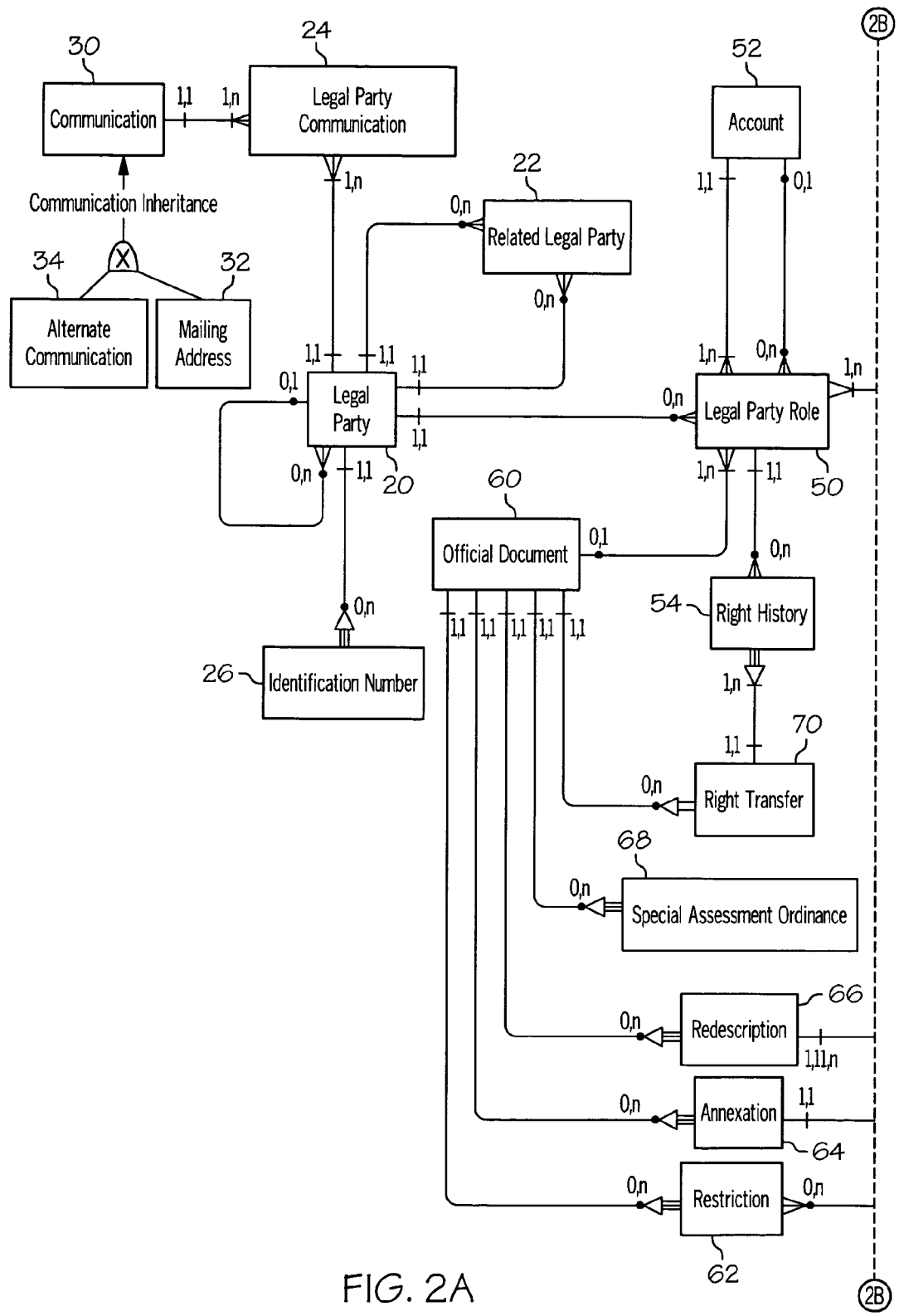
FIG. 2A is a first portion of an information model for party and property management.
Figure 2B:
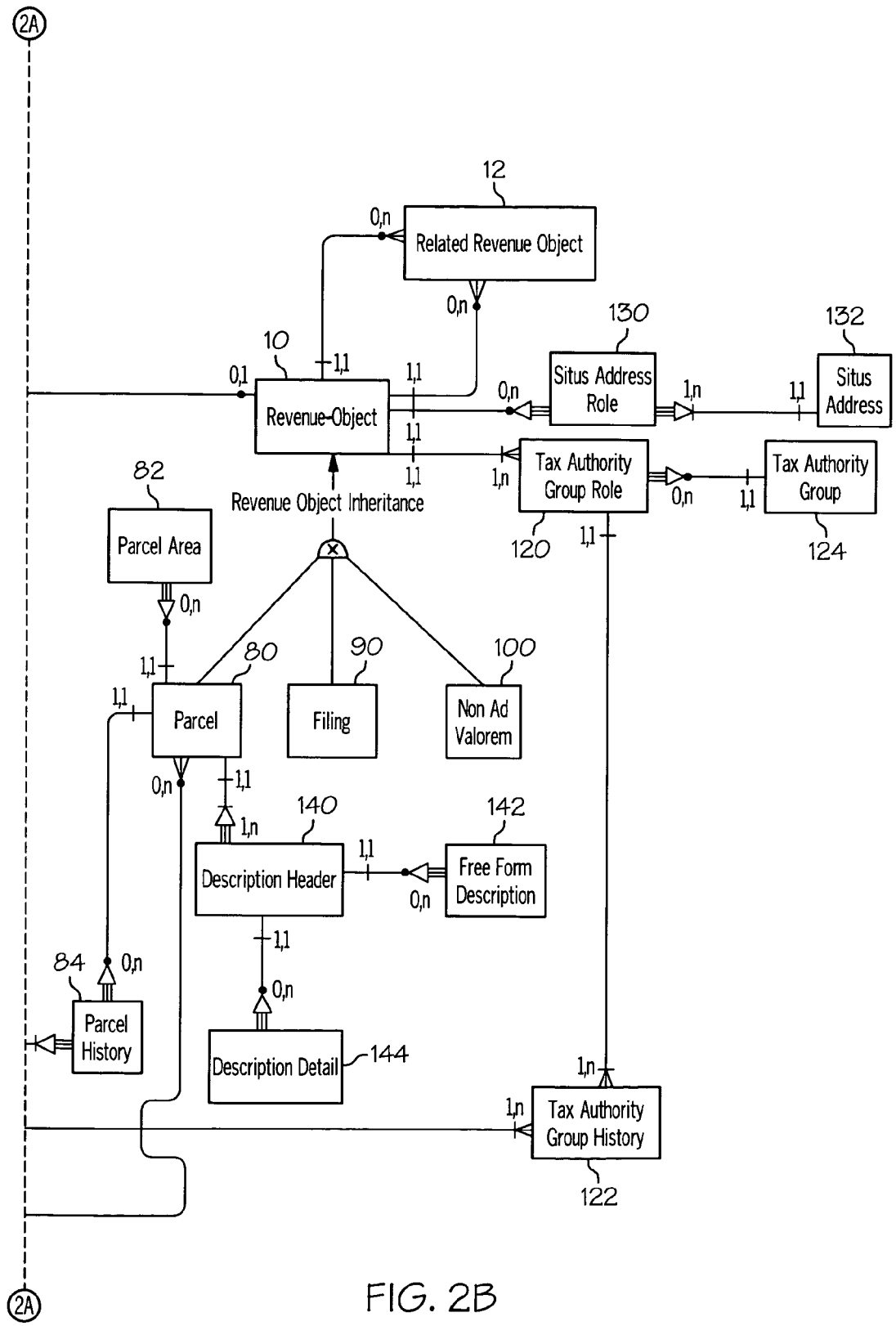
FIG. 2B is a second portion of an information model for party and property management.

FIG. 2A and FIG. 2B, when joined, show an information model for party and property records management. Many types of cardinality, which defines the numeric relationships between occurrences of the objects on either end of the relationship line, may be used between the objects within that information model. In one embodiment, the cardinality between the associated objects is shown in FIGS. 2A and 2B. The information model has a plurality of objects for maintenance of party and property data.

The information model is centered on two classes of objects, revenue-object object 10 and legal party object 20. Revenue-object object 10 is any entity that may generate revenue for the taxing jurisdiction. Examples of revenue-object objects 10 include, but are not limited to, real estate parcels, motor vehicles, personal property, or business licenses. Legal party object 20 is an individual, organization, or public agency that has legal standing and is recognized as a legal entity under the law. Once revenue-object object 10 and legal party object 20 are created they may be associated to each other. However, legal party objects 20 may exist in the system without any relationship to revenue-object objects 10. Legal party object 20 may have a plurality of associated related legal party objects 22, legal party communication objects 24, identification number objects 26, as well as other legal party objects 20 as aliases.

Related legal party object 22 maintains relationships between legal party object 20 and other legal party objects 20 based on special relationships. For example, a grandmother may be related to a son and a granddaughter; a partner to the partnership organization; or simply the spousal relationship may be represented. Furthermore, a primary legal party object 20 may be related to a plurality of secondary legal party objects 20 that represent aliases for the primary. For example, a woman may be known under her married name, a primary name, as well as her maiden name, a secondary name.

Communication object 30 represents a method to contact a legal party. Legal party communication object 24 maintains associations between legal party object 20 and any child object inheriting communication object 30. As a result, legal party object 20 may be associated to either mailing address objects 32 or alternate communication objects 34. Mailing address object 32, which inherits communication object 30, holds the names and addresses used to mail correspondence. Alternate communication object 34 contains additional methods for contacting a legal party such as an e-mail address. More than one communication object 30 may be associated to legal party object 20 and more than one legal party object 20 may be associated to the same communication object 30. Traditional data models have communication methods explicitly enumerated by named type with storage space for that particular named type; whereas, this invention provides the capacity for handling all existing communication methods as well as the flexibility to handle methods not yet defined or available.

Identification number object 26 contains a user-defined collection of identification numbers for both primary and alias legal party objects 20, which may include items such as social security, federal employer, state employer, or driver's license numbers, and any other type of identification numbers. For each collection of identification number objects 26 created for each legal party object 20, one identification number object 26 may be designated as a primary identification number object 26. Traditional data models have these types of identification numbers explicitly enumerated by named type with storage space for that particular named type. The information model disclosed herein provides the capacity for handling all existing identifications as well as identification systems of the future.

Legal party role object 50 maintains the associations and nature of the relationships between legal party object 20 and other existing objects within the information model. Legal party role object 50 is created when legal party object 20 is associated to another object, such as revenue-object object 10. Upon creation, the user may specify the nature of the relationship by role type, which is user definable. For example, a legal party may be related to a piece of real property with the role of owner. Legal party role object 50 maintains associations between legal party object 20 and a plurality of revenue-object objects 10, account objects 52, right history objects 54, and official document objects 60. When legal party role object 50 is associated with revenue-object object 10, objects must be associated with account object 52 as well.

Account object 52 maintains a collection of all revenue-object objects 10 associated with a particular legal party object 20. This object facilitates a grouping of revenue-object objects 10 for billing purposes. For example, account object 52 may contain a listing of real estate parcels, personal property, and/or business licenses owned by a particular legal party.

Right history object 54 provides a chain of title for a particular revenue-object object 10. A collection of right history objects 54 associated with a particular revenue-object object 10 provides all legal party objects 20 denoted as grantor or grantee associated with that revenue-object object 10. For example, a right history object 54 for a real estate parcel may contain a listing such as the following: Jane Smith (grantor) to John Riley (grantee), John Riley (grantor) to Jessica Green (grantee), etc. Right history object 54 also provides for recording the chain of title for separated rights derived from an existing revenue-object object 10 such as mineral rights when conveyed as separately owned property rights from the surface rights in land.

Official document object 60 represents an official document that affects one or more revenue-object objects 10 and/or legal party objects 20. Official document object 60 may be associated to a plurality of restriction objects 62, annexation objects 64, redescription objects 66, special assessment ordinance objects 68, and right transfer objects 70.

Restriction object 62 represents a restriction on the right of use of the property. It captures information related to administrative, judicial, or other limitations and permissions for the use and enjoyment of land by the land right holder. These are not transferred rights, although succeeding owners may agree to the same restriction on a parcel. An example is a covenant that does not run with the land. Official document object 60 and parcel object 80 may each be associated to a plurality of restriction objects 62, enumerating the restrictions associated with each respective object.

Annexation object 64 represents the annexation of a property by any jurisdiction from another jurisdiction, as well as the de-annexation of a property. For example, a city might annex property located at its border. It also describes an alteration of the tax authority group assigned to revenue-object object 10. Annexation object 64 may have a plurality of associated tax authority group history objects 122, which represent a chain of tax authorities involved with the annexation.

Redescription object 66 records the land description whenever it is re-described from what it was previously. This may occur when two or more land parcels are merged or a single parcel is divided, as well as when a survey is conducted. Redescription object 66 may be associated to a plurality of parcel history objects 84, which collectively provide a history tree of the parcel from a parent parcel to its children, as well as children that form a parent parcel.

Special assessment ordinance object 68 contains information regarding a special assessment ordinance associated with a particular piece of property.

Right transfer object 70 records the conveyance of rights and interests associated with revenue-object objects from a grantor to grantee. Furthermore, right transfer object 70 may be associated to a plurality of right history objects 54, which collectively provide a chain of ownership from grantors to grantees. Rights and interests are distinguishable from a restriction, which is a limitation placed by a governing party and is not in the chain of title.

Revenue-object object 10 represents a revenue source for that jurisdiction and is the lowest level of delinquency. Revenue-object object 10 may be inherited to instantiate parcel object 80, filing object 90, or non ad valorem object 100. Depending on the laws of a particular state, property will be categorized as one of the three types. Parcel object 80 typically contains real estate parcels. Filing object 90 typically contains personal property. Finally, non ad valorem object 100 may represent property not taxed on value, but on some other indicia. For example, business or occupational licenses are taxed solely because of their existence. Airplanes may be taxed based upon the engine horsepower, while boats may be taxed based upon length. These children of revenue-object object 10 may have a plurality of associated related revenue-object objects 12, tax authority group role objects 120, and situs address role objects 130.

Related revenue-object object 12 relates revenue-object object 10 to another revenue-object object 10. For example, related revenue-object object 12 may be used to associate a motor vehicle to a particular residence.

Situs address object 132 contains a list of physical addresses that may be associated with one or more revenue-object objects 10. Likewise, each revenue-object object 10 may be associated with one or more situs address objects 132. Situs address role object 130 maintains the associations between situs address object 132 and other existing objects.

Parcel object 80 of type revenue-object object 10 may have a plurality of associated parcel area objects 82, parcel history objects 84, restriction objects 62, and description header objects 140.

Parcel area object 82 contains area measurements such as legal acres, legal square footage, computed acres, computed square footage, as well as the parcel area type, which is a user-defined type. Such user-defined area types may be expressed in English, metric or other systems of measurement.

Description header object 140 provides the structure for assembling the components of a single legal description and may be associated to free form description objects 142 and description detail objects 144. Free form description object 142 contains those legal descriptions not in survey systems. For example, it may contain a metes and bounds description of the parcel. Description detail object 144 provides components of a single legal description that are used for creating legal descriptions based on areas. For example, it may contain a survey description of a real estate parcel. Description header object 140 may provide a description of the parcel based on a concatenation of the narrative description from associated free form description object 142 and the structured description from description detail object 144.

Tax authority group object 124 represents a unique group of tax authorities within a geographic area that may levy taxes against a property. Tax authority group object 124 may be associated to one or more revenue-object objects 10. These associations are maintained in tax authority group role object 120, which may be associated to a plurality of tax authority group history objects 122. Tax authority group history object 122 provides the history of changes of tax authority group objects 124 associated to particular revenue-object objects 10 and annexation objects 64. It identifies revenue-object objects 10 impacted by annexations, such as before and after tax authority groups.

Role objects (legal party role object 50, tax authority group role object 120, and situs address role object 130) act as gateways to other objects by controlling the associations between objects and classifications of those associations. Role objects also function to control security access to particular objects.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A computer-readable storage medium tangibly embodying an information model for managing party and property information from multiple data sources in a single data structure, the information model comprising:

a plurality of legal party objects including first and second legal party objects to represent first and second legal entities, respectively, the first and second legal entities being at least one of an individual, an organization and a public agency;

a plurality of revenue-object objects to represent a plurality of taxable items, wherein the first and second legal entities have a tax responsibility with respect to at least one of the plurality of taxable items represented by at least one of the plurality of revenue-object objects;

a plurality of legal party role objects including first and second legal party role objects to designate entity role types and to connect the first and second legal party objects respectively to the at least one of the plurality of revenue-object objects, whereby each of the first and second legal party role objects maintains a relationship between the first and second legal party objects and the at least one of the plurality of revenue-object objects;

a parcel object, a situs address role object, and a tax authority group role object associated with one of the plurality of revenue-object objects, wherein the plurality of revenue-object objects is inheritable by the parcel object;

a plurality of objects associated with the parcel object, wherein at least one of the plurality of objects associated with the parcel object is a description header object to represent a description of a real estate parcel, the description header object having an associated free form description object and a description detail object, wherein the plurality of objects associated with the parcel object includes a parcel history object and an associated re-description object to represent a prior description of the real estate parcel;

a situs address object associated with the situs address role object to represent the physical address of a taxable item;

a tax authority group object associated with the tax authority group role object to represent a tax authority that levies a tax against a taxable item; and a tax authority group history object associated with the tax authority group role object to represent a change in at least one tax authority, wherein the tax authority group history object is associated with an annexation object, wherein each of the parcel object, the plurality of objects associated with the parcel object, the situs address object, the tax authority group object and the tax authority group history object are tangibly embodied on the computer readable medium.

* * * * *